United States Patent [19]
Funk

[11] 4,114,135
[45] Sep. 12, 1978

[54] ACOUSTIC DEVICE

[75] Inventor: Clarence J. Funk, San Diego, Calif.

[73] Assignee: The United States of America as represented by the Secretary of the Navy, Washington, D.C.

[21] Appl. No.: 589,658

[22] Filed: Jun. 20, 1975

[51] Int. Cl.² ............................................ H04B 11/00
[52] U.S. Cl. ................... 340/2; 343/6 R (U.S. only)
[58] Field of Search ................... 340/2, 5 R; 343/6 R

[56] References Cited

U.S. PATENT DOCUMENTS

| | | | |
|---|---|---|---|
| 3,183,478 | 5/1965 | Slawsky et al. | 340/2 |
| 3,344,420 | 9/1967 | Arsove | 340/2 X |

Primary Examiner—Richard A. Farley
Attorney, Agent, or Firm—Richard S. Sciascia; Ervin F. Johnston; William T. Skeer

[57] ABSTRACT

A system for monitoring air-water borne noise generated by an aircraft flying over a body of water from within the aircraft includes a sonobuoy having a phase linear array of hydrophones suspended beneath the surface of the water and an electromagnetic radar transponder to permit accurate location of the surface position of the sonobuoy and a plurality of electroacoustic transponders to provide positioning information for the hydrophone array located in spaced relation from the first sonobuoy.

9 Claims, 3 Drawing Figures

ACOUSTIC DEVICE

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention pertains to oceanographic sciences and electronic instrumentation arts. More particularly, this invention pertains to the gathering of oceanographic material from airborne vehicles. In still greater particularity, but without limitation thereto, the invention pertains to the monitoring of low frequency artifacts occasioned by aircraft flying over a body of water.

DESCRIPTION OF THE PRIOR ART

As man continues to explore the world's oceans, the gathering of acoustic data has proved invaluable in extending the frontiers of man's knowledge of marine life and suboceanic geologic activities. Additionally, this information has made possible the location and tracking of man to underwater vehicles not readily apparent from the surface. Characteristically an aircraft flies over a predetermined patrol or monitoring area and interrogates oceanographic buoys which have been previously positioned along this monitoring path or which are placed in position or on-station immediately prior to the data gathering interrogations. As measurement techniques become more refined and the hydrophones become more sensitive, peculiar acoustic frequencies not attributable to oceanographic or underwater phenomenon have been observed. These frequencies, termed artifacts, have been discovered to be caused by noise generated by the aircraft itself. Typically, these noises are the low frequency, for example, less than 100 Hz. Of course, the precise frequency depends upon the noise source within the operational parameters of the particular aircraft.

Frequently, these artifacts are within the acoustic range of the signals of interest. Therefore, it has become necessary to calibrate or process the signals obtained from the oceanographic buoys to compensate for or otherwise modify the data gathered. Too, the information is useful to certain air crew members in adjusting the operation performance of the aircraft to alter the artifact frequency such that it may be moved to a range having a minimum affect on the acoustic signals being monitored. Heretofore, such real time monitoring has not been possible.

SUMMARY OF THE INVENTION

The invention overcomes the aforementioned difficulties with the prior art by providing a central buoyant sonobuoy having an extended pendant carrying a linear phased array of hydrophones to the desired operational depth. Sonobuoy additionally includes a radar transponder for locating the surface position of the sonobuoy. A plurality of electroacoustic pinger buoys are spaced apart from the sonobuoy and are located in the water to emit an acoustic ping detected by the linear phased array such that the position of the phased array with respect to the surface position of the supporting sonobuoy may be determined. A method of effective employment of this system also is regarded as novel.

STATEMENT OF THE OBJECTS OF INVENTION

Accordingly an object of this invention is to provide an improved electroacoustic monitoring system.

A further object of this invention is to provide a deployable, surface positioned monitoring system to permit an aircraft to monitor its own air-water borne noise.

A further object of this invention is to provide a buoy system which is responsive to air-water borne sound and includes position determining structure.

Another object of this invention is to provide oceanographic data gathering system for cooperation with an aircraft monitoring station.

These and other objects of the invention will become more readily apparent from the ensuing specification taken together with the drawings.

DESCRIPTION OF THE PREFERRED EMBODIMENT

Figure 1:
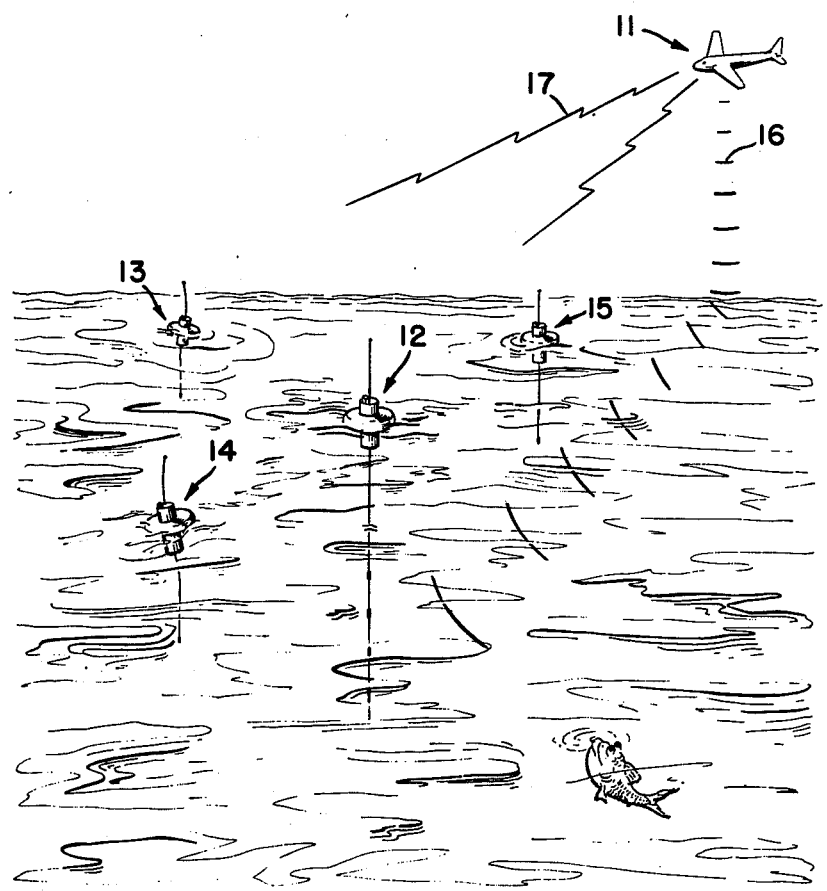
FIG. 1 is a perspective view of the system of the invention in operation.

Referring to FIG. 1, an aircraft 11 is shown approaching within communications range of an oceanographic buoy monitoring station. The oceanographic buoy monitoring station comprises a oceanographic buoy 12 and auxiliary transponder buoys 13, 14 and 15 located nearby. Aircraft 11 is in electronics communication with the buoy station as indicated by electrical energy transmission paths 17. Additionally, the acoustic energy emitted by aircraft 11, indicated as a series of wavefronts 16, is vertically coupled to the surface of the water where it is refracted and dispersed thereby to impinge a hydrophone array, to be more completely described herein.

Figure 2:
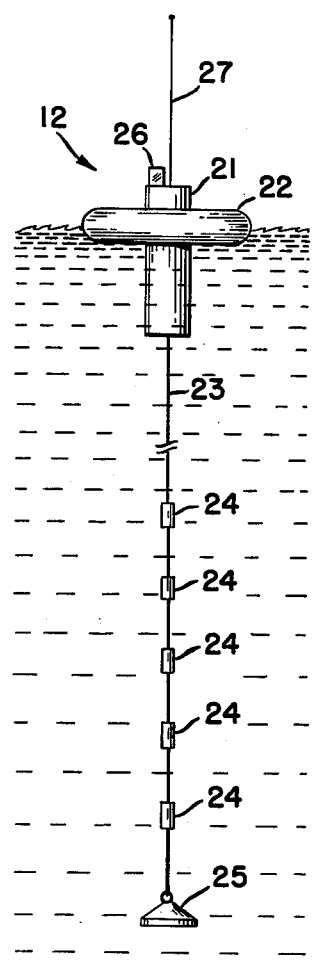
FIG. 2 is a side elevation view of the principal data gathering sonobuoy shown in FIG. 1.

Referring to FIG. 2, the principal components of oceanographic buoy 12 may be readily seen. A central housing 21 is buoyantly supported upon the surface of the water by means of an annular flotation unit 22. A pendant 23 is unwounded from the underwater portion of body 21 to extend downwardly therefrom and carry a plurality of electroacoustic transducers 24. The displacement of pendant 23 is accomplished by means of a weight 25 which, as is understood in conventional buoy practice, may comprise the lower portion of housing 21 used to close the end thereof when the buoy is in a storage or nondeployed condition.

Hydrophones 24 are spaced one from the other such as to provide a phase array which, as is understood in the art, increases the individual sensitivity of the hydrophones such that the resulting array has a sensitivity and frequency response enabling the detection of the faint air-water borne signal generated by overhead aircraft 11.

Because of the length of pendant 23 and the number of hydrophones 24 mounted thereon, pendant 23 may be subjected to lateral displacing forces caused by ocean currents and other forces acting thereon. It is essential for accurate calibration of the airborne analyzing equipment that this position of actual deployment be precisely known. Fortunately, this position may be accurately determined with existing techniques by activating a plurality of signals at spaced points, which are also known, by observing the time of reception of the signals. This function is accomplished by the auxiliary buoys 13, 14 and 15, illustrated in FIG. 1. Such buoys are well known and any type emitting an audio signal within the passband of the electroacoustic array comprise by hydrophones 24 may be employed. Of course, means for identifying a particular buoy emitting the pulse is incorporated in the individual buoys and may, for example, comprise frequency differences within the passband of the system.

The body of sonobuoy 21 houses a conventional oceanographic telemetered reception system such as shown in co-pending U.S. Pat. No. 3,875,548 issued on Apr. 1, 1975, to Robert S. Acks for "Calibrator Plug-In Module For Sonobuoy". Of course, other similar systems might be employed, if desired. The output from the hydrophone array is processed by this transmitter and transmitted, via antenna 27, to aircraft 11.

The precise surface location of buoys 12, 13, 14 and 15 is determined by means of positional radar carried by aircraft 11. The radar echo returns from each of the buoys is facilitated by means of a radar transponder 26 mounted on the exposed portion thereof. In its simplest form transponder 26 may be simply a tuned retroreflecting antenna. However, greater reliability and extended range may be obtained by using a triggered transponder. Additionally, the transponder may indicate which of the buoys the signal is returned from. Such active transponders are well known in the electronics art and need not be described in further detail for the understanding of this invention. For example, transponder techniques such as shown in the U.S. Pat. No. 3,277,478 issued on Oct. 4, 1966 to G. P. Erickson et al for "Transponder Requiring Delay Plus Short Time Differentials" may be used.

Figure 3:
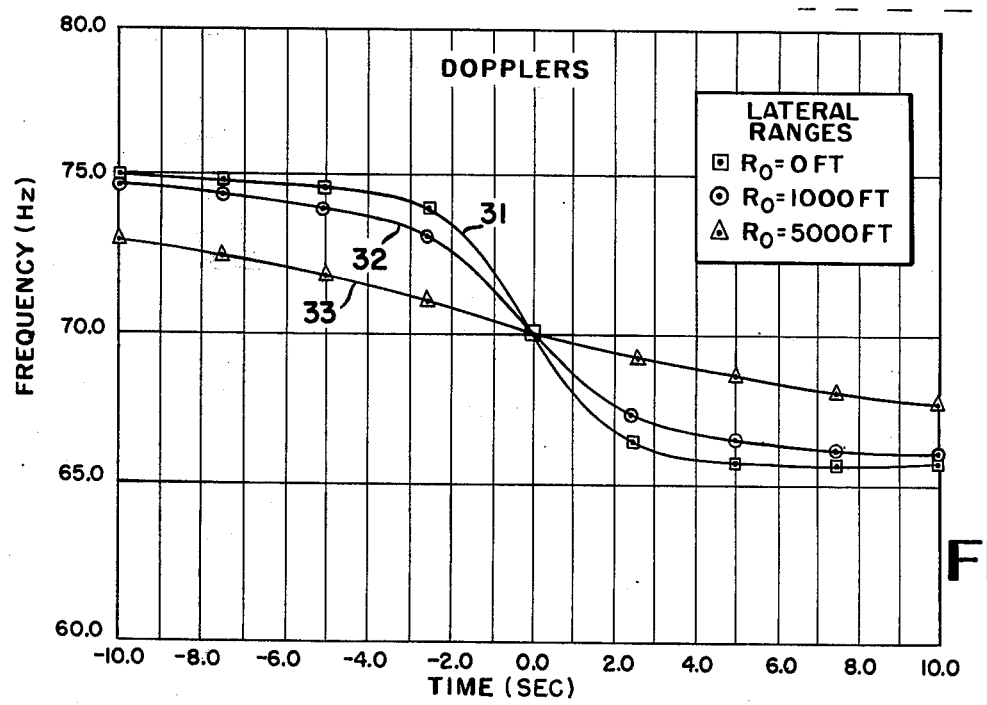
FIG. 3 is a graphic representation of the frequency versus time plot of the various dopplers illustrating the air-water borne signal being received in FIG. 1.

Referring to FIG. 3, the received signal from a 70 cycle acoustic frequency is illustrated as a function of time and frequency for different lateral ranges of closest approach, $R_o$. As shown, the doppler shift occasioned by the approach of aircraft 11 is fairly characteristic of the course aircraft 11 is flying with respect to the monitoring hydrophone array. Thus, curve 31 illustrates the doppler shift pattern when aircraft 11 crosses directly over the array supported by sonobuoy 12. Curve 32 shows the doppler variations occasioned by aircraft 11 reaching a lateral range of closest approach of 1,000 feet while curve 33 shows the doppler shift of a range of closest approach of 5,000 feet.

MODE OF OPERATION

Mode of operation of the system of invention comprises the deployment of the hydrophone array and the auxiliary pinger sonobuoys on the surface of the water in a locale where acoustic monitoring is desired. Such areas may include areas of distinct marine life or anticipated manned vehicle deployment. Hydrophone array comprised by hydrophones 24 is then deployed from sonobuoy 12 in a conventional fashion either by a squib actuation, pressure or solubility release, or other conventional mechanisms such that the hydrophone array is positioned beneath buoy 12. Aircraft 11 then approaches the marker buoy layout and locates the buoy by means of conventional airborne radar which, cooperating with the position indicating means afforded by transponders 26, determines the surface location and configuration of the buoy array. The pinger transponders are then actuated by suitable telemetry command linkage such that the calibration of data dependent upon the precise position of the hydrophone array may be determined. Aircraft 11 may then approach the monitoring area observing its own acoustic signature including low frequency artifacts and make such adjustments as may be required to move such an artifact if such movement is needed or to process the ambient acoustic signals received in the presence of this artifact. The adjustments necessary to move the acoustic artifact may be to the aircraft power plant or to the flight trim controls.

The foregoing description taken together with the appended claims constitute a disclosure such as to enable a person skilled in the electronics and oceanographic arts and having the benefit of the teachings contained therein to make and use the invention. Further, the structure and methods herein described meet the objects of invention, and generally constitute a meritorious advance in the art unobvious to such a worker not having the benefit of these teachings.

Obviously, many modifications and variation of the present invention are possible in the light of the above teachings, and, it is therefore understood that within the scope of the disclosed inventive concept, the invention may be practiced otherwise than specifically described.

What is claimed is:

1. A system for self monitoring of air-water borne noise from an aircraft comprising:
    An acoustic monitoring buoy including;
        pendent means attached to said acoustic monitoring buoy and extending downwardly therefrom,
        a plurality of electroacoustic transducers attached to said pendent means to form a phased array to detect predetermined artifact frequencies originating from said aircraft and transmitted through the water,
        communication means effectively connected to said plurality of electroacoustic transducers for transmitting said detected artifact frequencies to said aircraft, and
        positioning means attached to said acoustic monitoring buoy for indicating to the aircraft the location of said acoustic monitoring buoy; and
    a plurality of acoustic pinger buoys positioned about and spaced from said acoustic monitoring buoy each having a positioning means similar to that positioning means on said acoustic monitoring buoy for indicating to the aircraft the location of the individual pinger buoy to which it is attached.

2. A system for self monitoring of air-water borne noise according to claim 1 in which said plurality of electroacoustic transducers are constructed and spaced to detect a low frequency acoustic signal.

3. A system for self monitoring of air-water borne noise according to claim 1 in which at least one of the aforerecited positioning means includes a radar retroreflector.

4. A system for self monitoring of air-water borne noise according to claim 2 in which at least one of the aforerecited positioning means includes a radar retroreflector.

5. A system for self monitoring of air-water borne noise according to claim 1 in which at least one of the aforerecited positioning means includes an active radar transponder.

6. A system for self monitoring of air-water borne noise according to claim 2 in which at least one of the aforerecited positioning means includes an active radar transponder.

7. A method of monitoring air-water borne noise made by an aircraft located in the air over a body of water from within said aircraft comprising the steps of:

suspending an electroacoustic phased array within the water from beneath a point on the surface thereof so as to intercept the acoustic energy therein including acoustic energy within the water originating from the aircraft;

communicating said intercepted signals to said aircraft; and locating the position of the electroacoustic phased array with respect to the aircraft.

8. A method of monitoring according to claim 7 wherein said step of locating the position of the electroacoustic phased array includes the location of the surface position of the electroacoustic array.

9. A method of monitoring according to claim 8 wherein the step of locating the position of the electroacoustic array further includes the step of determining the orientation of the array with respect to the vertical.

* * * * *